3,061,812
PULSE TYPE DEPTH SOUNDER
Alfons Z. Rachwalski, Miami, Fla., assignor, by mesne assignments, to Jetronic Industries, Inc., a corporation of Pennsylvania
Filed Sept. 28, 1959, Ser. No. 842,811
13 Claims. (Cl. 340—3)

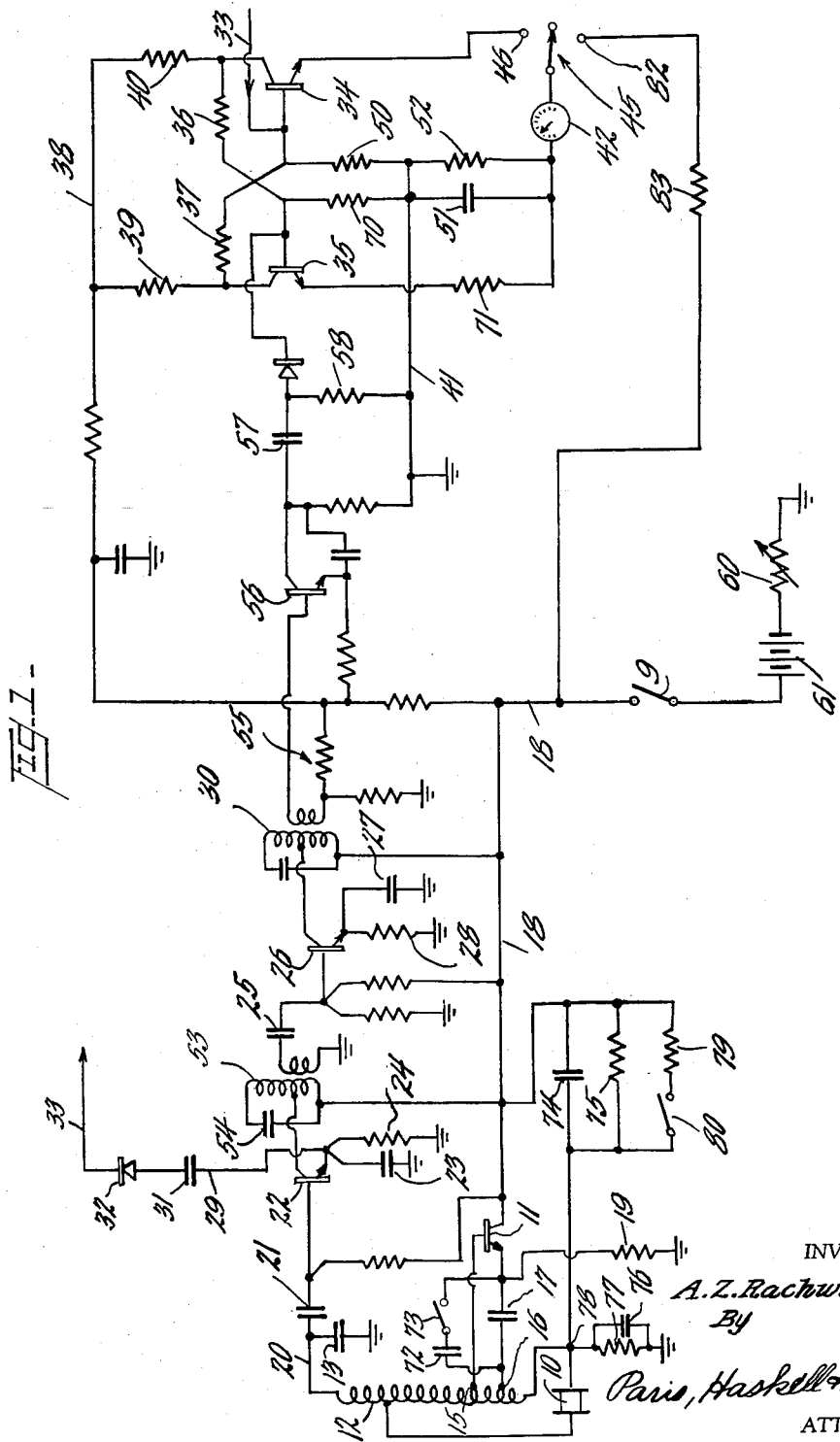

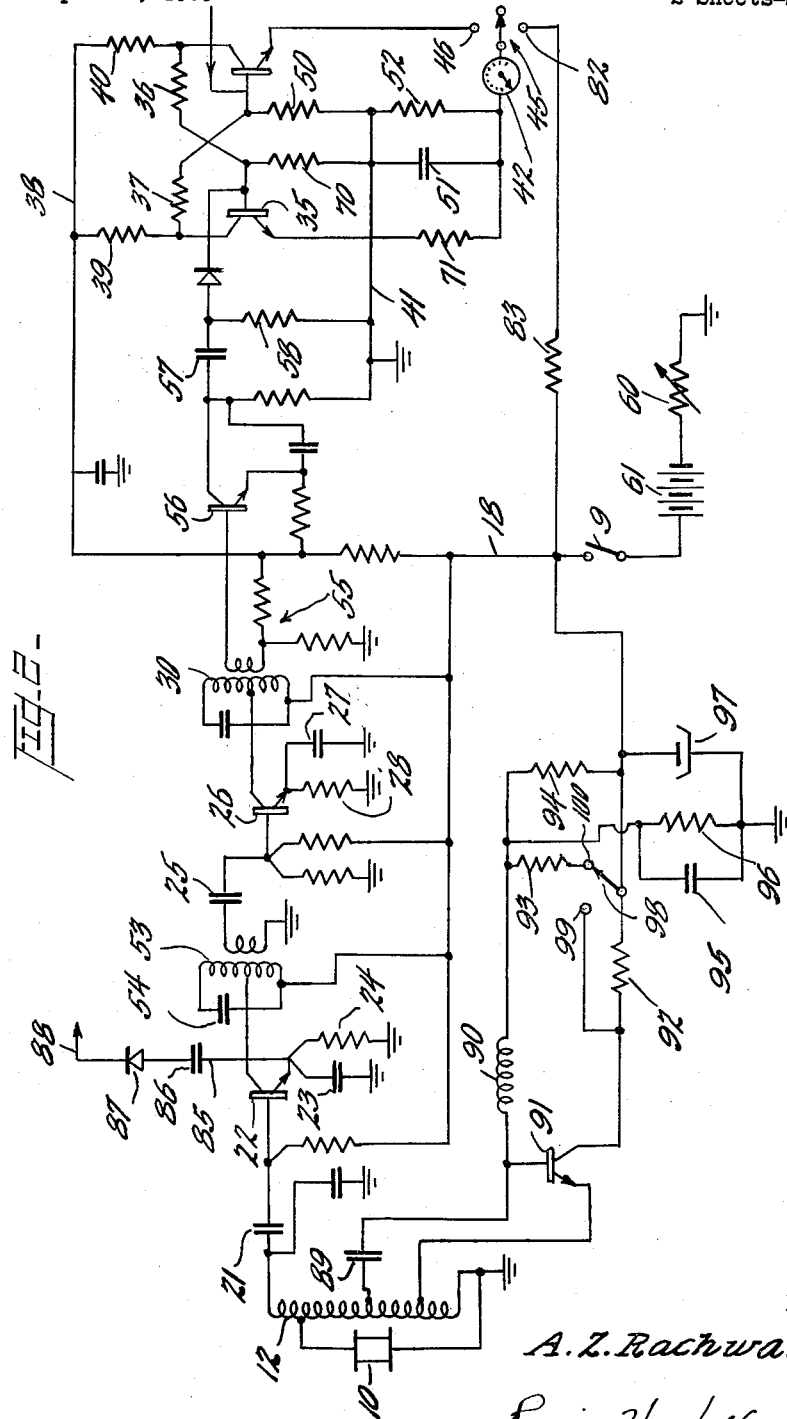

This invention generally relates to improvements in depth meters or sounders and is particularly concerned with pulse type depth meters that transmit sonic pulses for reflection from a solid object, such as the ocean floor, and obtain a precise measurement of the time interval between the transmission of the sound wave pulse and the receipt of its echo to determine the depth or distance of travel.

Depth sounders or echo ranging apparatus of this general type are well known in the art and the more precise varieties employ electronic tube circuits in the transmitter, receiver, and timing mechanism to precisely measure the distance or depth of travel of the pulse. Many of such devices are necessarily portable, being carried by various water craft along with many other instruments and equipment for navigational and related functions. Consequently, it is essential that such devices be as small, lightweight, and low power consuming as possible, compatibly with providing the accuracy and dependability needed to carry out their intended function. However, as is well known, electron tube circuits together with the necessary switching means are neither as compact, rugged, or dependable and long lived as is desired for portable applications and accordingly considerable effort is being constantly expended in improving these characteristics of such devices.

According to the present invention, there is provided a depth sounder system of this general type that is comprised wholly of transistor circuits for performing the functions of transmitting, receiving and timing of the electrical pulse energy. In addition to eliminating the electron tubes, bringing about appreciable reductions in the size, weight and power consumption of the equipment, the present invention provides a number of other advantages and simplifications over prior art devices. Among others, the present invention includes an improved means of coupling the transmitter and receiver circuits in such manner as to eliminate the need for special isolating switches or other such means that are usually required to prevent the high power transmitted pulses from entering the receiver. Rather the present invention employs a less complex means for electrically attenuating the high power transmitter pulses in the receiver while amplifying the lower power reflected echo pulses to provide the necessary accuracy. The present invention also includes improved and simplified means for performing the timing functions and for accurately calibrating and adjusting the system whereby the device may be used by relatively unskilled operators without the need for extensive instruction.

It is accordingly a primary object of the invention to provide an improved depth meter of low weight, small size and low power consumption.

A further object is to provide these physical improvements without sacrificing accuracy and precision in measurement.

A still further object is to provide such a device of simplified and less complex construction.

Another object is to provide such a device that may be readily converted or adjusted for measuring different distance ranges without change in accuracy.

Other objects and many additional advantages will be more readily understood after a consideration of the following detailed specification and drawings wherein:

FIG. 1 is an electrical schematic drawing illustrating one preferred embodiment of the invention, and FIG. 2 is a schematic similar to FIG. 1 and illustrating an alternative preferred oscillator circuit.

Referring now to the drawing, there is generally shown a transceiver circuit comprising a transducer element 10 adapted to function both as a transmitter or producer of sonic impulses and a receiver of the reflected echo pulses to reconvert the received sonic pulses into electrical form for time measurement purposes.

Energizing the transducer 10, there is provided a regular time pulse oscillator circuit, generally comprising a transistor 11 and resonant tank circuit therefor, including a parallel connected tank coil 12 and capacitor 13. All of the components of the pulse oscillator circuit are interconnected in a Hartley type configuration with the base element of transistor 11 being connected to tap 15 on coil 12 and with the emitter and collector elements of transistor 11 being connected in series to tap 16 of coil 12 through a cut-off capacitor 17. The transistor 11 thus has feedback provided by the resonant tank circuit, and upon being properly energized by a D.-C. potential over line 18 and suitably biased, it is inherently unstable and oscillates for a short period of time until the cut-off capacitor 17 becomes negatively charged sufficiently to prevent conduction from the emitter to the collector elements of transistor 11. This cut-off potential across capacitor 17 prevents further conduction through the transistor 11 thereby abruptly stopping the oscillation of the circuit. After cut-off, the capacitor 17 discharges through resistor 19 until the voltage thereacross is lowered sufficiently to again permit the transistor 11 to conduct thereby enabling the circuit to again oscillate for a short time until capacitor 17 is again recharged to terminate conduction of the transistor 11. As thus far described, therefore, the oscillator circuit regularly produces short impulses of A.-C. energy at a frequency determined by the resonant frequency of the combined tank circuit and transducer 10, and for a time interval controlled by the value of capacitor 17. The repetition rate between the pulses of A.-C. energy is primarily controlled by the time constant of capacitor 17 and discharge resistor 19, as well as the potential over line 18 and may be varied by changes in these quantities. Each of these A.-C. pulses is produced across transducer 10 and converted by the transducer to a sonic impulse which is transmitted outwardly from the transducer and propagated toward the ocean floor or other target.

Simultaneously, with the outward transmission of each sonic pulse, the electrical oscillation pulse is also directed backwardly into the receiver to establish the beginning of the measurable time interval. Tracing the electrical pulse backwardly into the receiver, the pulse appears across the upper terminal of coil 12 and passes backwardly over line 20 and through coupling capacitor 21 to the base element of the first stage transistor 22. Transistor 22 is connected in circuit as a tuned amplifier having a parallel connected output filter comprised of a transformer 53 tuned to the desired resonant frequency by a capacitor 54, with the tuned circuit being connected in the emitter to collector circuit of transistor 22, as shown. Consequently, this first stage of the receiver functions to amplify electrical pulse signals in the predetermined frequency bandwidth and to reject all other frequencies.

The transmitted pulse being produced by oscillator 11 and applied to the first stage of the receiver has a much greater amplitude than is necessary for functioning of the receiver. In fact, if this oscillator pulse were normally applied to the receiver without compensating means, it would be sufficiently great to damage the receiver transistors. Consequently, according to the present invention, the first stage transistor 22 is provided with a protective capacitor 23 and resistor 24, being connected from its emitter element to ground, which elements function to prevent this large potential pulse from damaging the circuit. The capacitor 23 and resistor 24 also function to normally bias the transistor 22. As this large amplitude transmitted pulse is applied to the base element, it immediately causes conduction from the emitter element to the collector element of transistor 22, thereby rapidly charging the capacitor 23 and raising its potential, whereby the voltage across capacitor 23 substantially follows that of the incoming pulse. This charging of capacitor 23 in turn rapidly raises the potential at the emitter element reducing the current flow through the transistor 22, and in effect reducing the gain of the first stage. In other words, the function being provided by the capacitor 23 and resistor 24 is to both protect the receiver from being damaged by the large transmitted pulse and attenuate the pulse before further transmission through the receiver. Since this large charge on capacitor 23 takes a given time interval to decay, the receiver is also attenuated for a time interval after the transmitted pulse when reflected pulses would be sufficiently large to damage the receiver.

From the output of the first stage existing across the secondary winding of transformer 53, the attenuated transmitter pulse is directed through a coupling capacitor 25 to the base element of a second stage transistor 26 connected as a tuned amplifier in essentially the same circuit configuration as the first stage. This second stage transistor 26 also is provided with a protecting capacitor 27 and resistor 28 in its emitter to ground circuit to prevent the large amplitude transmitter pulses from damaging the transistor and for additionally reducing the gain of the second stage to the large amplitude pulses.

The first stage transistor 22 also provides a second output signal being taken from its emitter element and directed upwardly over line 29. This signal taken from the emitter element over line 29 has a gain or amplification of less than one, since in this type connection the amplifier stage operates essentially as an emitter-follower circuit. From the emitter element of transistor 22 the signal is directed upwardly over line 29 and through a coupling capacitor 31 to a miniature diode 32. Diode 32 serves to rectify the A.-C. component from the transmitted pulse and produces a D.-C. pulse over line 33 which is directed to the base element of a transistor 34 located at the far right in the drawing. Transistor 34 is connected in a bistable or flip-flop circuit with a mating transistor 35 whereby the rectified pulse over line 33 serves to render transistor 34 conducting and transistor 35 nonconducting.

More specifically, transistors 34 and 35 are connected in a mutual feedback circuit, with the collector element of transistor 34 being connected in feedback through resistor 36 to the base element of transistor 35, and with the collector element of transistor 35 being connected in feedback through a resistor 37 to the base element of transistor 34. Both transistors 34 and 35 receive D.-C. energizing potential on their collector elements from line 38 and through equal value resistors 39 and 40. The emitter element of transistor 35 is connected to ground line 41 through a resistor 71 and a biasing capacitor 51 and resistor 52, and the emitter of transistor 34 is connected to ground line 41 through a meter 42 and the same biasing capacitor 51 and resistor 52. Consequently, with this mutual feedback connecting the transistors in a flip-flop arrangement, only one or the other transistor 34 or 35 may conduct current; and upon conducting, it renders the other transistor at substantially cut-off condition.

Returning to the pulse signal being transmitted over line 33 in response to the transmitted pulse, this pulse is applied to the base element of transistor 34 causing this transistor to conduct current from its emitter to its collector elements and thereby substantially cutting off conduction through the other transistor 35 of the flip-flop circuit.

According to the present invention, the flip-flop circuit, together with a meter 42, is employed as a time measuring circuit to precisely indicate the time interval between the outward transmission of a sonic impulse and the receipt of its reflected echo impulse. This function is performed by triggering the flip-flop circuit into a first stable condition simultaneously with the transmission of each sonic pulse, and upon receiving the reflected echo pulse, triggering the flip-flop back into its original stability condition. In this manner, the flip-flop circuit remains in a given stability condition during the time interval between the transmission of each conic pulse and the receipt of its reflected echo whereby an accurate measurement of this time interval may be made by determining the time period that the flip-flop circuit assumes this first stability condition.

For measuring this first stability condition of the flip-flop circuit, there is provided a meter 42 which is adapted to be connected in the emitter to ground circuit of transistor 34 by means of a switch 45. As shown, when switch 45 is engaging its upper contact 46, one terminal of meter 42 is connected to the emitter of transistor 34 and the other terminal thereof is connected to ground through the biasing capacitor 51 and resistor 52. Consequently, whenever transistor 34 is conducting, the current flows through the meter 42. Since the time intervals to be meaesured are considerably shorter than the inertia or time constant of the meter 42, the meter averages the current through transistor 34 and consequently indicates the time interval that transistor 34 is conducting.

Recapulating briefly the functioning of the receiver as thus far described, each transmitted signal pulse being produced by oscillator 11 energizes the transducer 10 to produce an outgoing sonic pulse and is also directed backwardly through the first two stages of the receiver, passing through transistors 22 and 26. This signal is thence directed upwardly over line 29 and through diode 32 to trigger or cause conduction of flip-flop transistor 34 signaling the beginning of the time interval to be measured. A meter 42 is connected in circuit with transistor 34 to provide an indication of the time interval that this transistor is conducting.

After the transmitted sonic impulse is propagated from transducer 10, it travels outwardly until it strikes and is reflected from a body opaque to sound, such as the ocean floor, whose distance from the transducer 10 is to be determined. The reflected sonic pulse is thence directed backwardly to the transducer 10 and is received a short time interval later. This time interval between the transmission of the sonic pulse and the receipt of its reflected echo is accordingly equal to twice the distance between the transducer 10 and the object to be measured since, as is well known, the sonic pulse travels at constant speed through the water or other medium. Upon receiving the echo pulse, an electrical signal of reduced amplitude is produced across tank coil 12 and capacitor 13 which in this instance operates as a receiver tank circuit. This electrical signal is thence transmitted over line 20 and through coupling capacitor 21 to the base element of first stage transistor 22. The received pulse passes through both the first and second stages of the receiver, comprising the circuits of transistors 22 and 26, to provide a pulse signal across both the secondary winding of transformer 30 in the output circuit of the second stage amplifier and a pulse signal over line 29. Since the received echo pulse is of much lower amplitude than the original transmitted pulse, both stages of the receiver operate to provide high gain amplification, since neither stage is saturated as it would be when receiving the large amplitude transmitted pulse.

From the secondary of transformer 30, the received echo pulse is thence directed through a resistor coupling circuit generally designated 55 and to the base element of a transistor 56, which is connected as a pulse detector circuit, serving to remove the higher frequency carrier portion of the pulse and transmitted only the envelope of the pulse. The detected echo pulse is thence directed through a differentiating circuit including the capacitor 57 and resistor 58, which provide sharp edged signals at the leading edge and trailing edge of the detected echo pulse. The trailing edge differentiated signal is rejected by a diode 59 and not permitted to pass further into the receiver circuit, but the leading edge differentiated signal is directed over line 60 to the base element of transistor 35, which as discussed above is the second transistor in the flip-flop circuit. This sharp edged differentiated pulse has sufficient amplitude to trigger the flip-flop transistor 35 into conduction, thereby reversing the conducting condition of the flip-flop and signaling the end of the measured time interval. Since the meter 42 is connected to average the current through transistor 34, the reading of meter 42 is thus proportional to the time interval that transistor 34 is conducting and hence is proportional to the time interval between the transmitted sonic pulse and the received echo pulse. The meter 42 is also preferably calibrated in terms of distance in feet or other, and consequently directly reads the distance that the sonic pulse has traveled to the selected target.

As will be recalled from the earlier description of the first stage of the receiver, this first stage provides two output signals, the first being taken from the emitter element of transistor 22 and directed upwardly over line 29, and the second being taken from the secondary of tuned transformer 53. The first signal being directed upwardly over line 29 is ultimately directed to the base element of transistor 34 of the flip-flop circuit, and the second signal from transformer 53 is ultimately directed to the base element of the second flip-flop transistor 35, as described above. Consequently, both the transmitted pulse and the received echo pulse are each directed to both transistors of the flip-flop circuit at the beginning of the time interval and at the end thereof. However, the transmitted pulse being directed upwardly over line 29 is not differentiated whereas the signal from transformer 30 is differentiated before reaching the flip-flop circuit. Consequently, upon transmission of the sonic pulse at the beginning of the measured time interval, the large amplitude pulse passing into the receiver and to transistor 34 has a much greater time duration than the differentiated pulse directed to transistor 35 and will override the narrow differentiated pulse to cause conduction of transistor 34 at the beginning of each time interval. On the other hand, at the end of the time interval when a low amplitude echo pulse is received, this low amplitude pulse is not amplified by the first stage transistor 22 before passing to flip-flop transistor 34 from line 29, but is amplified by this transistor 22 and by transistor 26 before passing to transistor 35 from the secondary of transformer 30. Consequently at the end of the measurable time interval, the pulse reaching flip-flop transistor 35 overrides the pulse reaching flip-flop transistor 34 whereupon the flip-flop stability condition is reversed and transistor 35 is made conducting and transistor 34 made non-conducting. Thus at the beginning of each time interval the receiver functions to render flip-flop transistor 34 conducting and flip-flop transistor 35 non-conducting and at the end of each time interval functions to reverse the conducting conditions of the flip-flop transistors. Consequently, transistor 34 remains conducting only during the time interval between transmission of a sonic pulse and receipt of its reflected echo whereby the meter 42 connected in circuit with transistor 34 indicates this measure interval or its equivalent, the distance traveled by the sonic pulse.

According to a preferred embodiment, the transceiver of the present invention may be employed to detect a number of different distance ranges with but minor adjustment of the components. For example, to detect distances of from zero to 150 feet and indicate the same over the full scale on meter 42, the oscillator circuit may be designed for a frequency of 200 kilocycles, and the values of capacitor 17 and resistance 19 selected to provide a pulse duration of five milliseconds and a pulse repetition rate of one pulse every fifty milliseconds. If it is then desired to change this range and employ the transceiver to detect over a distance range of only zero to 15 feet while employing the full scale reading of meter 42, it is only necessary to change the pulse repetition rate. Since this repetition rate is controlled by the time constant of capacitor 17 and resistor 19 as well as by the D.-C. potential over line 18, this distance range may be quite easily varied by merely reducing the D.-C. voltage over line 18 as controlled by the variable resistor 60 interconnecting line 18 with the potential source 61. The meter 42 may, of course, be calibrated directly in feet and be provided with a number of scales indicating the different ranges. It is evident, of course, that reducing the voltage on line 18 also reduces the transmission power of the sonic pulses. However, for the smaller distance ranges, the transmission power can be appreciably reduced without adverse effect.

Alternatively, the distance range of measurement may be also varied by changing the value of the capacitance 17 or by changing the D.-C. potential serving to bias the oscillator transistor 11. In the former, the value of discharging capacitance 17 may be varied by providing additional capacitors, such as capacitor 72, in parallel therewith, as shown, together with a switch 73 in circuit for selectively adding or removing the additional capacitor 72, as desired. To perform the latter, the D.-C. potential biasing the oscillator transistor 11 may also be easily varied. As shown, the emitter element of transistor 11 is supplied with a negative bias potential by means of a potential divider circuit comprising a parallel connected capacitor 74 and resistor 75 in series relation with the parallel connected capacitor 76 and resistor 77. This series circuit is connected from D.-C. potential line 18 to ground, and the junction point 78 between the two parallel circuits is connected to the lowermost terminal of tank coil 12. Consequently, a negative D.-C. potential exists at junction 78 serving to bias the emitter element of oscillator transistor 11. This negative D.-C. bias may be varied by selectively adding additional resistors, such as resistor 79, in parallel with resistor 75 by means of a switch 80. This additional resistance, when connected by closing switch 80, varies the ratio of the potential divider, thereby to increase the negative bias on transistor 11 and shorten the pulse repetition rate for smaller distance range measurements.

Since the pulse repetition rate is related to the D.-C. energizing potential over line 18, it is necessary that this potential be accurately calibrated prior to operation of the device for echo ranging measurements. To perform this calibrating function, the meter 42 may be initially switched to read the voltage of source 61 and permit adjustment of resistance 60 before operation of the equipment. As shown, the switch means 45 is provided with a lower contact 82 to connect the meter 42 to read the voltage on line 18. Before operation of the equipment, therefore, the switch 45 is positioned to engage the lower contact 82, thereby placing one terminal of the meter 42 across line 18 through a resistor 83, which resistor serves to select the proper range of the meter for measurement. Thereafter, the power switch 9 is closed, connecting the power source 61 from ground to line 18. The meter 42 is thereby connected to read the potential on line 18, and if this potential is not at its predetermined value, the operator may adjust the variable resistor 60, in series with the meter 42, until the desired voltage on line 18 is obtained. After this adjustment is made the operator may then position meter switch 45 to its upper contact 46 and the transceiver is conditioned for operation.

To further reduce the size and weight of the transceiver, the preferred circuit shown is readily adapted to being produced in printed circuit form since the power requirements of the transistors are extremely small and all of the components are readily obtainable in miniature or subminiature sizes. This circuitry has been successfully operated with a potential source 61 of only 8 volts and drawing a current of only a few milliamperes.

In FIG. 2 is shown an alternative embodiment of the invention incorporating a time spaced pulse oscillator circuit of improved stability. Referring to FIG. 2, there is shown a transistor 91 having a base, emitter and collector elements, with the circuit from the base to emitter elements being connected through a control capacitor 89 and across a portion of the tank coil 12 and transducer 10. The circuit from the collector to emitter elements of the transistor are connected in series circuit relationship with a loading resistor 92 to the main switch 9, direct current power source 61 and variable control resistor 60 to ground, and returning to the emitter element of the transistor through the lowermost portion of the tank coil 12. In the remaining circuit of the transistor leading from the base element to collector element there is provided a choke coil 90 in series with a parallel connected pair of resistors 93 and 94, whose opposite ends connect with loading resistor 92 leading to the collector element.

In operation, after closing main switch 9, a D.-C. current flows through resistors 93 and 94 in parallel and through resistor 96 to bias the base element of transistor 91 positively permitting the transistor to conduct and the circuit to oscillate. During the period of oscillation, a rectifying action takes places between the emitter to base junction during alternate half cycles with the result that capacitor 95 is progressively charged negatively with respect to the transistor base element. When a sufficiently negative charge is established across the capacitor 95, the transistor is biased to cut-off, thereby blocking further oscillation and completing the first pulse. After this first pulse has been completed and conduction through transistor 91 is cut off, the control capacitor 95 discharges through the resistors and through the transistor 91 thereby removing the negative voltage on the base element after a predetermined interval and permitting the capacitor 95 to again become positively charged and again commence oscillation of the circuit to produce a second pulse.

In this manner, the oscillator circuit emits periodically time spaced pulses of oscillation as in the circuit of FIG. 1 with the width of each pulse determined by capacitor 95 and the characteristics of the transistor 91 and the time spacing between pulses determined by the time constant of the circuit.

As in the embodiment of FIG. 1, each of these A.-C. pulses is produced across transducer 10 and converted by the transducer to a sonic impulse which is transmitted outwardly from the transducer and propagated toward the ocean floor or other target. To vary the range of distance measurement, the frequency or pulse repetition rate may be varied to change the time interval between pulses by increasing or decreasing the time constant of capacitor 95 and resistors 93 and 94, or 96, and the transistor 91. For small changes in the time constant, the resistors 93 and/or 94 may be made variable to increase or decrease the overall resistance presented by the parallel connection of these resistors. It is also possible, of course, to vary the capacitance presented by capacitor 89 to achieve the same end. However, as a practical matter, it is more feasible and preferred to vary the resistance values rather than the capacitor 89.

As in FIG. 1, it is desired to employ the transceiver to measure a different range of distances such as to switch from a range of from zero to fifteen feet to the longer distance range of from zero to 150 feet, and to perform this function a much larger increase in the time constant is required. For this purpose there is provided a switch 98 in the circuit that selectively adds or removes the resistor 93 from the circuit. Referring to FIG. 2 it is noted that with switch 98 engaging its right hand fixed contact 100, the resistor 93 is connected in parallel with resistor 94 but with switch 98 positioned to engage its left hand fixed contact 99, the resistor 93 is removed from the circuit and resistor 94 alone is connected to capacitor 89. Consequently, with switch 98 engaging right hand contact 100, the time constant of the circuit is much shorter in time permitting closer distance measurements and with switch 98 engaging contact 99, the time constant is much longer in time for the much more distant range measurements.

In addition to varying the pulse repetition rate, the switch 98 also provides the function of selectively varying the amplitude of the oscillator pulses depending upon the distance range selected. That is for short distance measurements, the amplitude of the oscillator pulses is reduced by providing a loading resistance 92 in the collector to emitter circuit of transistor 91 whereas for the longer distance range measurements, the switch 98, in its left hand position engaging fixed contact 99, serves to short circuit the loading resistance 92, thereby increasing the current flow from the collector to the emitter of transistor 91 and increasing the amplitude of the oscillator pulses.

To isolate the A.-C. oscillator pulse and prevent its entering the D.-C. source 61, there is also provided a large capacitor 97 also connected between D.-C. power line 18 and ground which serves the function of by-passing the A.-C. oscillator pulses preventing their transmission to D.-C. source 61. Performing a similar isolating function with respect to the base element, the choke coil 90 prevents the passage of the A.-C. oscillator pulses from following the circuit leading from the collector element to the base element through resistors 93 and 94.

It is quite important to note that the regularly time spaced pulse oscillator circuit of FIG. 2 provides a significant advantage over the oscillator of FIG. 1. In FIG. 1, the blocking capacitor 17 is connected in the circuit leading from collector to emitter elements of transistor 11 and consequently must receive a larger charge to function in cutting off conduction through the transistor. In the circuit of FIG. 2, on the other hand, the blocking capacitor 89 is provided in the base to emitter element of transistor 91 and consequently may control cut-off with a smaller negative charge. This enables a capacitor having a paper dielectric to be employed, which type of capacitor possesses a considerably greater stability and dependability of the oscillator circuit.

What is claimed is:

1. In an echo pulse ranging depth meter, a transistor transmitter for producing regularly recurring pulses, a transistor receiver including a transistor flip-flop circuit, said receiver including means for coupling each said transmitter pulses to condition the flip-flop in a first stability condition, and responsive to its reflected echo pulse to reverse the stability condition, and means for measuring the time intervals that the flip-flop is in said first stability condition to determine the range of the object reflecting said pulse, said receiver including an amplification stage for receiving both the transmitter pulses and received echo pulse and variable biasing means for attenuating the received transmitter pulses and amplifying the received echo pulses.

2. In an echo depth meter, a transistor oscillator and receiver connected in common with a resonant tank circuit, a transducer energized by said tank circuit during transmission and energizing said tank circuit during reception, said receiver including a transistor amplifier stage having a high gain output channel and an attenuating output channel each coupled to a transistor flip-flop circuit, differentiating means responsive to the high gain output channel to energize a first transistor in said flip-flop circuit, rectifying means responsive to said attenuating output channel to energize another transistor in said flip-flop circuit, and means for indicating the time interval of conduction of one of said flip-flop transistors.

3. In the meter of claim 2, means for reducing the amplification of said transistor amplifier stage and protecting the amplifier from damage during transmission and for a short time thereafter.

4. In the meter of claim 3, said amplification reducing means including a capacitor in feedback connection with said amplifier stage and being chargeable by large signals received by said stage to proportionally increase its operating bias voltage.

5. In a depth meter, a transistor oscillator for producing regularly spaced transmission pulses, a transistor receiver coupled thereto to receive said transmission pulses and reflected echo pulses, said receiver including means for increasing the biasing on a receiver transistor proportionally to the amplitude of the received pulses, thereby to attenuate said transmission pulses and amplify said received echo pulses, said receiver having a first output channel of normally high amplification and a second output channel of lower amplification, a transistor flip-flop circuit, means for indicating the time interval said flip-flop circuit assumes a given stability condition, differentiating means coupling said first amplifier channel to said flip-flop to assume a first stability condition upon energization by a reflected pulse, and rectifying means coupling said second amplifier channel to said flip-flop to assume a second stability condition upon energization by a transmission pulse.

6. In the meter of claim 5, said receiver biasing means including a capacitor for receiving an electrical charge proportional to the amplitude of the received pulse.

7. In the depth meter of claim 6, said receiver including a transistor having base, emitter, and collector electrodes, means connecting said capacitor in said emitter circuit and connecting said emitter circuit to said rectifying means, and means coupling said collector element to said differentiating means.

8. In a depth meter having a transducer and a transmitter circuit and receiver circuit connected thereto for alternative transmission and reception of sonic impulses, a transistor amplifier in said receiver, said amplifier having an attenuating output channel and an amplifying output channel, a flip-flop circuit, means coupling said attenuating output channel to enable triggering of said flip-flop in a first stability condition and differentiating means coupling said amplifying output channel to enable triggering of said flip-flop in the opposite stability condition, and means coupling both the transmitted pulses and received echo pulses to said amplifier.

9. An amplitude discriminating circuit including an amplifying stage having a high gain output channel and a low gain output channel, self-biasing means for said amplifier to reduce the amplification in the high gain output channel in response to large amplitude input signals and to restore said amplification for low amplitude input signals, whereby in response to large amplitude input signals the low gain output channel provides a higher power output than the high gain output channel, and in response to small amplitude input signals, the high gain output channel provides a considerably higher amplitude output than the low gain output channel.

10. In the circuit of claim 9, said self-biasing means including a capacitor and resistor.

11. In the circuit of claim 10, said amplifying stage comprised of a transistor having a base, emitter and collector, with said biasing capacitor connected in the emitter circuit, said high gain output channel coupled from the collector and said low gain output channel coupled from said emitter.

12. In a pulse type depth meter for transmitting time spaced pulses and receiving reflected echo pulses, an amplifier for receiving both large amplitude transmitted pulses and lower amplitude reflected echo pulses, said amplifier having a high gain output channel and a separate low gain output channel, a flip-flop circuit connected to assume a first stability state in response to alternate signals received from the low gain output channel and to assume a second stability condition in response to alternate signals received from the high gain output channel, means conditioning said amplifier to reduce the gain thereof for large amplitude transmitted pulses whereby the flip-flop assumes a first stability condition in response thereto and a second stability condition in response to reflected echo pulses.

13. An echo pulse range meter, comprising generating means for producing a series of regularly recurring electrical pulses, transducer means coupled to said generating means for converting said electrical pulses into sonic energy pulses and for converting reflected echo sonic energy pulses into electrical pulses, a receiver coupled to said generating means and to said transducer for receiving electrical pulses from both said generating means and said transducer means, a bi-stable flip-flop circuit having two inputs, said receiver having an amplifying channel coupled to one of said inputs and a second channel coupled to the other of said inputs, said amplifying channel including means for desensitizing this channel in response to a high power pulse applied thereto while providing high gain therein in response to a low power pulse applied thereto, whereby upon the application to said receiver of a high power pulse from said generating means, said flip-flop circuit responds preferentially to the signal applied thereto through said second channel to assume a first stable state, and upon the application to said receiver of a low power pulse from said transducer means, said flip-flop circuit responds preferentially to the signal applied thereto through said amplifying channel to assume a second stable state, and means for measuring the portion of time wherein said flip-flop circuit is in one of said stable states.

References Cited in the file of this patent

UNITED STATES PATENTS

| 2,433,667 | Hollingsworth | Dec. 30, 1947 |
| 2,476,902 | Paine et al. | July 19, 1949 |
| 2,500,638 | Krauth | Mar. 14, 1950 |
| 2,567,229 | Morse | Sept. 11, 1951 |
| 2,780,795 | Ambrosio | Feb. 5, 1957 |
| 2,878,312 | Goodrich | Mar. 17, 1959 |
| 2,891,146 | Sciurba | June 16, 1959 |

OTHER REFERENCES

Transistorized Fish-Finder by Walter F. Mitchell, Electronics World, vol. 62, No. 2, August 1959, pp. 92, 43, 44, 108 and 110.